United States Patent
Sutardja

(10) Patent No.: US 7,529,057 B1
(45) Date of Patent: *May 5, 2009

(54) SERVO LOOP EMPLOYING CORRECTION VECTOR FROM A SECONDARY DISTURBANCE SENSOR TO MINIMIZE CORRELATION BETWEEN SERVO LOOP ERROR AND DISTURBANCE SENSOR OUTPUT

(75) Inventor: Pantas Sutardja, Los Gatos, CA (US)

(73) Assignee: Marvell International Ltd., Hamilton (BM)

(*) Notice: Subject to any disclaimer, the term of this patent is extended or adjusted under 35 U.S.C. 154(b) by 0 days.

This patent is subject to a terminal disclaimer.

(21) Appl. No.: 12/231,921

(22) Filed: Sep. 8, 2008

Related U.S. Application Data

(63) Continuation of application No. 11/602,665, filed on Nov. 21, 2006, now Pat. No. 7,423,833.

(60) Provisional application No. 60/749,938, filed on Dec. 13, 2005.

(51) Int. Cl.
G11B 5/596 (2006.01)
G11B 21/10 (2006.01)

(52) U.S. Cl. .............. 360/77.03; 360/77.02; 369/44.32

(58) Field of Classification Search .................. None
See application file for complete search history.

(56) References Cited

U.S. PATENT DOCUMENTS

| | | |
|---|---|---|
| 4,455,675 A | 6/1984 | Bose et al. |
| 4,494,074 A | 1/1985 | Bose |
| 5,181,252 A | 1/1993 | Sapiejewski et al. |
| 5,208,868 A | 5/1993 | Sapiejewski |
| 5,305,387 A | 4/1994 | Sapiejewski |
| 5,889,875 A | 3/1999 | Caron et al. |
| 5,912,821 A * | 6/1999 | Kobayashi .................. 700/280 |
| 6,407,876 B1 | 6/2002 | Yamaguchi et al. |
| 6,414,813 B2 | 7/2002 | Cvancara |
| 6,417,983 B1 | 7/2002 | Yatsu |
| 6,493,172 B1 | 12/2002 | Morris et al. |
| 6,567,525 B1 | 5/2003 | Sapiejewski |
| 6,580,579 B1 | 6/2003 | Hsin et al. |
| 6,654,197 B1 | 11/2003 | Ho |
| 6,683,965 B1 | 1/2004 | Sapiejewski |

(Continued)

OTHER PUBLICATIONS

USPTO Non-Final Office Action mailed Jan. 8, 2008 for U.S. Appl. No. 11/602,665, filed Nov. 21, 2006.
Amendment filed Apr. 8, 2008 in response to USPTO Non-Final Office Action mailed Jan. 8, 2008 for U.S. Appl. No. 11/602,665 filed Nov. 21, 2006.

*Primary Examiner*—Hoa T Nguyen
*Assistant Examiner*—James L Habermehl

(57) ABSTRACT

A control system including a filter module generates a filtered disturbance signal based on a disturbance signal and a transfer function of the filter module. A set point adjustment module generates an adjusted set point signal based on a set point signal and the filtered disturbance signal. A servo control module generates an error signal based on the adjusted set point signal and a position feedback signal. A filter adjustment module generates a filter adjustment signal based on the disturbance signal and the error signal. The filter adjustment signal adjusts the transfer function.

19 Claims, 6 Drawing Sheets

U.S. PATENT DOCUMENTS

| | | |
|---|---|---|
| 6,684,233 B1 | 1/2004 | Koike |
| 6,710,966 B1 | 3/2004 | Codilian et al. |
| 7,193,808 B2 | 3/2007 | Takaishi |
| 7,423,833 B1 | 9/2008 | Sutardja |
| 2002/0080514 A1 | 6/2002 | Richards et al. |
| 2005/0264922 A1 | 12/2005 | Erden et al. |

* cited by examiner

SERVO LOOP EMPLOYING CORRECTION VECTOR FROM A SECONDARY DISTURBANCE SENSOR TO MINIMIZE CORRELATION BETWEEN SERVO LOOP ERROR AND DISTURBANCE SENSOR OUTPUT

CROSS-REFERENCE TO RELATED APPLICATIONS

This application is a continuation of U.S. patent application Ser. No. 11/602,665, filed Nov. 21, 2006, which claims the benefit of U.S. Provisional Application No. 60/749,938, filed Dec. 13, 2005. The disclosures of the above application are incorporated herein by reference in their entirety.

FIELD

The present disclosure relates to servo control systems for hard disk drives.

BACKGROUND

A hard disk drive (HDD) includes at least one platter that is coated with a magnetic medium. The platter is axially mounted to a rotating spindle. An arm pivots parallel to the coated surface of the platter and carries a read/write head. A servo motor, such as a voice coil motor, moves the arm to position the read/write head over a selected one of several concentric tracks recorded on the magnetic medium.

A servo control system drives the servo motor and receives a position feedback signal from the read/write head. The feedback signal is generated when servo codes, which are interspersed with data recorded in the concentric tracks, pass under the head. The servo control system uses the feedback signal to periodically adjust the position of the arm so that the read/write head aligns with the selected track.

The servo codes are recorded on the magnetic medium when the disk drive is manufactured. The servo codes can be positioned at selected intersections of the concentric tracks and imaginary line segments that radiate outward from the spindle. The resulting pattern of servo codes can appear as pie slices and can be referred to as servo wedges. The frequency of the feedback signal is based on the rotational speed of the spindle and the number of servo wedges. Increasing the frequency or servo sampling rate of the feedback signal can improve position tracking between the head and the selected one of the concentric tracks. The servo control system therefore becomes more robust against disturbances, e.g. vibration and shock, when the servo sampling rate increases.

In some HDDs, such as those commonly used in desktop computers, the platter diameter is about 3.5 inches and the spindle speed is about 7200 revolutions per minute (RPM). These HDDs can provide a servo sampling rate as high as 50-60 kHz (15-20 µS servo period). In other HDDs, such as small form-factor HDDs, the platter diameter can be less than about 1.8 inches. Small form-factor HDDs are commonly used in portable and handheld mobile applications. To meet low power dissipation requirements, small form-factor HDDs generally have spindle speeds between about 3600 and 4200 RPM. Small form-factor HDDs also have between about 120 and 180 servo wedges.

Based on the aforementioned attributes, small form-factor HDDs typically provide a servo sampling rate between about 8.3 and 12.5 kHz (80-120 µS servo period). With this low servo sampling rate, any disturbance that occurs while the head is between servo codes and moves the head by more than about 10% of the track width can become problematic for drive performance and read reliability. Some prior-art servo control systems inhibit reading and writing until the head realigns with the selected concentric track. Such a solution can have undesirable effects in high data rate, high vibration applications such as hand-held music and/or video players.

SUMMARY

A noise canceling system includes a signal generator module that generates a set point signal based on a desired position signal and a position feedback signal, a summation module that generates an output control signal based on the set point signal and a correction signal, and a filter module that generates the correction signal based on a disturbance signal and that minimizes a correlation between the disturbance signal and an error signal. The error signal represents a difference between the desired position signal and the position feedback signal.

In other features the noise canceling system includes a disturbance sensor module that generates the disturbance signal. The disturbance sensor module includes a rotational inertial sensor. An output of the filter module is used to minimize the error signal. The filter module employs a filter coefficient to generate the correction signal. The filter coefficient is determined based on an adaptive least mean squares (LMS) algorithm. The coefficient is generated while the disturbance signal generates a white-noise spectrum. A correlator module generates a correlation signal based on the disturbance signal and the error signal. A transfer function of the filter module is based on the correlation signal. The position feedback signal is updated and the filter module generates the correction signal between the times that the position feedback signal is updated.

In other features a rotating memory system includes the noise canceling system and further includes a motor that is adapted to position a read/write head based on the output control signal and a rotating platter that includes servo codes that are read by the read/write head. The read/write head generates the position feedback signal based on the servo codes. The rotating platter can include a magnetic coating. The rotating platter can include an optical coating. The desired position signal represents a track on the rotating platter. The motor is a voice coil motor. An arm extends radially from a first axis. The read/write head is positioned on the arm and a disturbance sensor module generates the disturbance signal based on the disturbance sensor moving around an axis that is parallel to the first axis.

A hard disk drive includes a servo loop having an adjusted set point signal and a vibration sensor that generates a vibration signal. The adjusted set point signal and the vibration signal are correlated to generate a correlation signal. The correlation signal is used to adjust the adjusted set point signal.

A method of operating a noise canceling system includes generating a set point signal based on a desired position signal and a position feedback signal, generating an output control signal based on the set point signal and a correction signal, generating the correction signal based on a disturbance signal, and minimizing a correlation between the disturbance signal and an error signal. The error signal represents a difference between the desired position signal and the position feedback signal.

In other features the method includes generating the disturbance signal. The disturbance signal represents rotational acceleration. The method includes using the correction signal to minimize the error signal. Generating the correction signal includes employing a filter coefficient. The method includes determining the filter coefficient based on an adaptive least mean squares (LMS) algorithm. The method includes generating the filter coefficient while the disturbance signal generates a white-noise spectrum. The method includes generating a correlation signal based on the disturbance signal and the error signal. The method includes generating a transfer function based on the correlation signal. The transfer function relates the disturbance signal and the correction signal. The method includes updating the position feedback signal and generating the correction signal between the times that the position feedback signal is updated.

In other features a method of operating a rotating memory system includes the method of operating a noise canceling system and further includes positioning a read/write head of the rotating memory system based on the output control signal and using the read/write head to read servo codes that are on a rotating platter of the rotating memory system. The position feedback signal is based on the servo codes. The desired position signal represents a track on the rotating platter. The rotating memory system includes an arm that extends radially from a first axis and the read/write head is positioned on the arm. The method includes generating the disturbance signal based on the rotating memory system moving around an axis that is parallel to the first axis.

A method of operating a hard disk drive includes providing a servo loop that includes an adjusted set point signal, generating a vibration signal, generating a correction signal based on a correlation of the adjusted set point signal and the vibration signal, and adjusting the adjusted set point signal based on the correlation signal.

A noise canceling system includes signal generator means for generating a set point signal based on a desired position signal and a position feedback signal, summation means for generating an output control signal based on the set point signal and a correction signal, and filter means for generating the correction signal based on a disturbance signal and minimizing a correlation between the disturbance signal and an error signal. The error signal represents a difference between the desired position signal and the position feedback signal.

In other features the noise canceling system includes disturbance sensor means for generating the disturbance signal. The disturbance sensor means includes rotational inertial sensor means for generating the disturbance signal based on rotating motion about an axis. An output of the filter means is used to minimize the error signal. The filter means employs a filter coefficient to generate the correction signal and the filter coefficient is determined based on an adaptive least mean squares (LMS) algorithm. The coefficient is generated while the disturbance signal generates a white-noise spectrum. Correlator means generate a correlation signal based on the disturbance signal and the error signal. A transfer function of the filter means is based on the correlation signal. The position feedback signal is updated and the filter means generates the correction signal between the times that the position feedback signal is updated.

In other features a rotating memory system includes the noise canceling system and further includes motor means for positioning a read/write head based on the output control signal and rotating platter means for providing servo codes that are read by the read/write head. The read/write head generates the position feedback signal based on the servo codes. The rotating platter means can include a magnetic coating for recording data that is arranged in at least one track. The rotating platter means can include optical coating means for recording data that is arranged in at least one track. The desired position signal represents a track of the rotating platter. The motor means includes a voice coil motor. Arm means providing a support that extends radially from a first axis. The read/write head is positioned on the arm means. Disturbance sensor means generate the disturbance signal based on the disturbance sensor means moving around an axis that is parallel to the first axis.

A hard disk drive includes servo loop means for controlling a position of read/write arm and include an adjusted set point signal. Vibration sensor means generate a vibration signal. The adjusted set point signal and the vibration signal are correlated to generate a correlation signal. The correlation signal is used to adjust the adjusted set point signal.

A computer program is stored on a computer readable medium and is executed by one or more processors. The computer program operates a noise canceling system and includes generating a set point signal based on a desired position signal and a position feedback signal, generating an output control signal based on the set point signal and a correction signal, generating the correction signal based on a disturbance signal, and minimizing a correlation between the disturbance signal and an error signal. The error signal represents a difference between the desired position signal and the position feedback signal.

In other features the computer program includes generating the disturbance signal. The disturbance signal represents rotational acceleration. The computer program includes using the correction signal to minimize the error signal. Generating the correction signal includes employing a filter coefficient. The computer program includes determining the filter coefficient based on an adaptive least mean squares (LMS) algorithm. The computer program includes generating the filter coefficient while the disturbance signal generates a white-noise spectrum. The computer program includes generating a correlation signal based on the disturbance signal and the error signal. The computer program includes generating a transfer function based on the correlation signal. The transfer function relates the disturbance signal and the correction signal. The computer program includes updating the position feedback signal and generating the correction signal between the times that the position feedback signal is updated.

In other features a computer program is stored on a computer readable medium and is executed by one or more processors. The computer program operates the noise canceling system of a rotating memory system and includes positioning a read/write head of the rotating memory system based on the output control signal and using the read/write head to read servo codes that are on a rotating platter of the rotating memory system. The position feedback signal is based on the servo codes. The desired position signal represents a track on the rotating platter. The rotating memory system includes an arm that extends radially from a first axis and the read/write head is positioned on the arm. The computer program includes generating the disturbance signal based on the rotating memory system moving around an axis that is parallel to the first axis.

A computer program is stored on a computer readable medium and is executed by one or more processors. The computer program operates a hard disk drive and includes providing a servo loop that includes an adjusted set point signal, generating a vibration signal, generating a correction signal based on a correlation of the adjusted set point signal and the vibration signal, and adjusting the adjusted set point signal based on the correlation signal.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
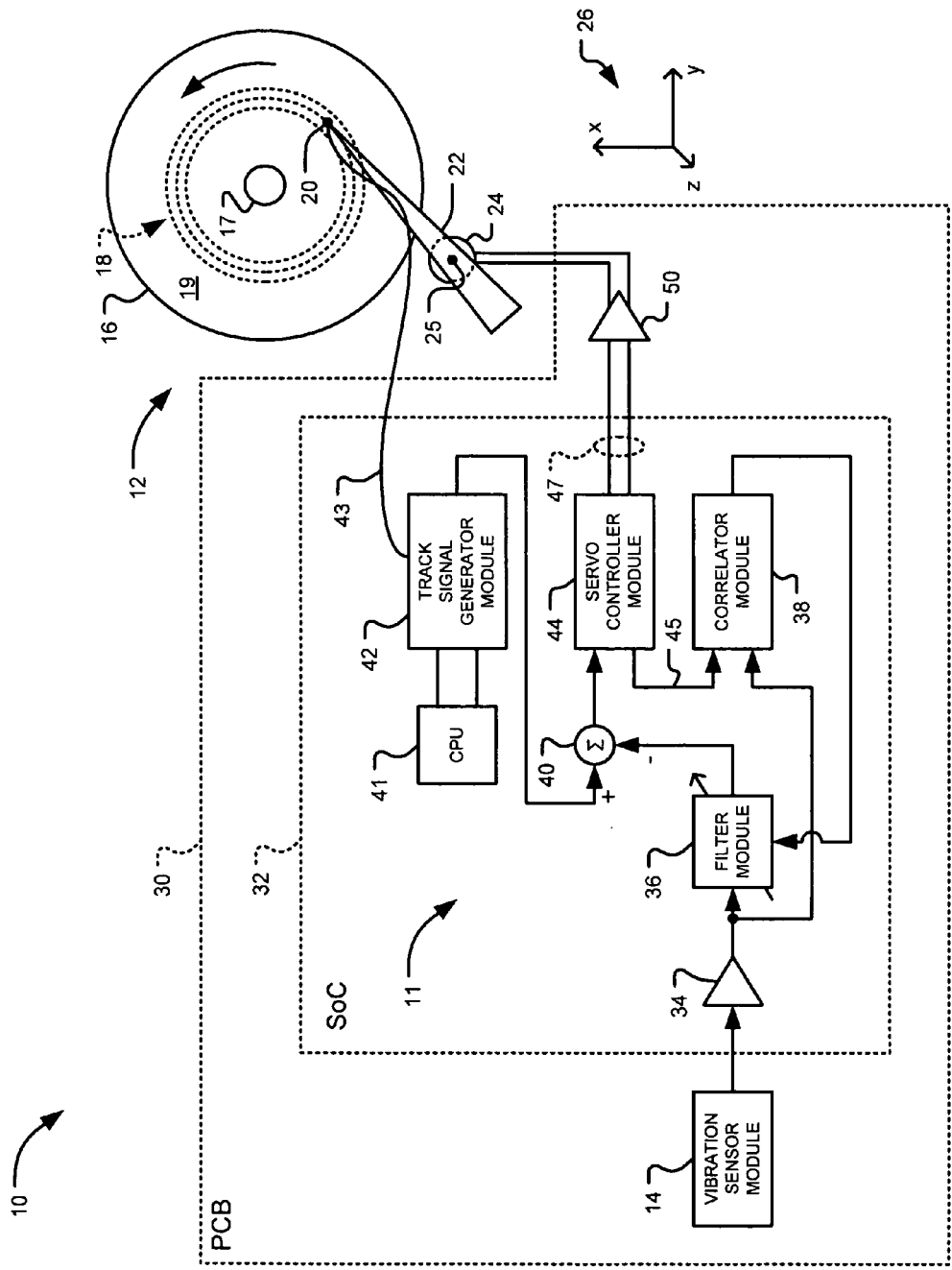
FIG. 1 is a functional block diagram of a disk drive assembly that includes an improved servo control system.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Referring now to FIG. 1, a disk drive 10 includes an improved servo control module 11, a rotating memory device 12, and a vibration sensor module 14. Rotating memory device 12 includes a platter 16 that is mounted to a rotating spindle 17. Platter 16 includes a face 19 that is coated with a magnetic and/or optical medium. Data and servo codes are recorded on the medium in a pattern of one or more tracks 18. Tracks 18 can be concentric with spindle 17. A read/write head 20 is located on a pivoting arm 22. The longitudinal axis of arm 22 lies generally parallel to the face of platter 16. A servo motor 24 includes a shaft that may be linked and/or directly coupled to arm 22. Arm 22 pivots about a pivot axis 25 that is parallel to a z-axis as indicated by axes 26. Servo motor 24 swings arm 22 generally parallel to the x-y plane, as indicated by axes 26, until head 20 is positioned over a selected one of tracks 18. The longitudinal axis of spindle 17 and pivot axis 25 can be parallel and fixed with respect to each other.

Pivot axis 25 can extend through the center of gravity of arm 22. Such an arrangement minimizes a swinging motion that is induced in arm 22 when the disk drive 10 is accelerated, such as by vibration, along a line parallel to the x-y plane and/or the z-axis. This arrangement does not, however, minimize a tracking error between head 20 and the selected track 18 when disk drive 10 is rotationally accelerated around the z-axis.

Servo control module 11 is adapted to minimize the tracking error when disk drive 10 is subjected to vibration. Vibration sensor module 14 generates a vibration signal based on the vibration. In some embodiments the vibration signal indicates the axis, direction, and/or acceleration magnitude of the vibration. Vibration sensor module 14 can be positioned on a printed circuit board (PCB) 30 and/or formed in a system-on-chip (SoC) 32. In some embodiments vibration sensor module 14 is a high-bandwidth rotational shock sensor and/or a rotational inertial sensor. Vibration sensor module 14 can be arranged to be sensitive to rotation around the z-axis.

Servo control module 11 can include an analog-to-digital converter (ADC) 34 that digitizes the vibration signal. The vibration signal is provided to a programmable filter module 36 and a first input of a correlator module 38. In some embodiments, filter module 36 includes a finite impulse response (FIR) filter. In some embodiments, filter module 36 includes one or more filter coefficients that are determined based on an adaptive least mean squares (LMS) algorithm. An output of filter module 36 is provided to an inverting input of a summation module 40. A non-inverting input of summation module 40 receives a set point signal from a track signal generator module 42.

Track signal generator module 42 generates the set point signal based on a servo feedback signal 43 and desired track data that is generated by a central processing unit (CPU) 41. The desired track data corresponds with the selected one of the tracks 18. Servo feedback signal 43 is refreshed each time servo data passes under head 20. An output of summation module 40 generates an adjusted set point signal that is based on the set point signal from track signal generator module 42 and the filtered vibration signal from filter module 36. The adjusted set point signal is provided to a servo controller module 44. Servo controller module 44 generates an error signal 45 and a command signal 47. Error signal 45 represents a difference between servo feedback signal 43 and the set point signal from track signal generator module 42. Error signal 45 is provided to a second input of correlator module 38. Correlator module 38 generates a correlation signal based on error signal 45 and the vibration signal. The correlation signal communicates with a programming input of filter module 36. Correlator module 38 can program one or more coefficients of filter module 36 when disk drive 10 is originally assembled.

An output of servo controller module 44 generates command signals based on the adjusted set point signal. The command signals are provided to a motor driver 50. Motor driver 50 drives motor 24 based on the command signals to position head 20 over the selected track 18. The position of head 20 is thereby controlled by a servo loop that includes track signal generator module 42, summation module 40, servo controller module 44, motor driver 50, motor 24, arm 22, head 20, and servo feedback signal 43. The filtered signal from vibration sensor module 14 is added to the servo loop to correct anticipated position errors in the positioning of head 20 due to vibration. The filtered signal can also continuously compensate for vibration, thereby reducing the risk of accumulating position error during the period between servo codes.

Figure 2:
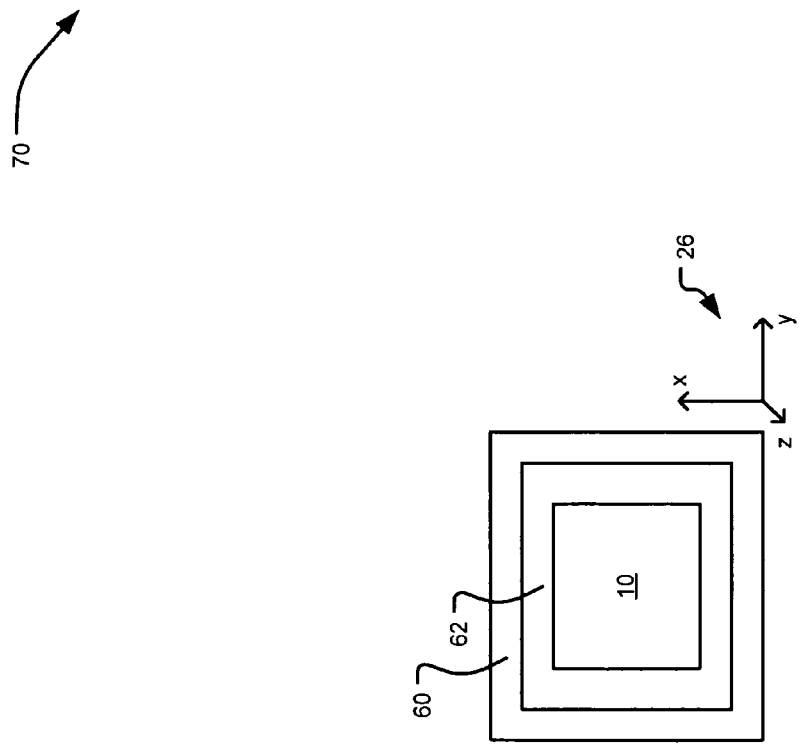
FIG. 2 is functional block diagram of calibration fixture for the disk drive assembly of FIG. 1.

Referring now to FIG. 2, a functional block diagram is shown of a calibration fixture 60 that can be used to program filter module 36. Calibration fixture 60 includes a vibration platform 62 that vibrates disk drive 10. In some embodiments, vibration platform 62 employs a white-noise vibration spectrum and/or random vibration. In some embodiments the vibrations that are provided by vibration platform 62 can be provided by ambient vibrations in an assembly environment for disk drive 10.

Correlator module 38 sends the correlation signal to filter module 36 while disk drive 10 is vibrating. The coefficients of filter module 36 are then programmed to minimize the correlation signal that indicates correlation between the vibration signal from vibration sensor module 14 and the error signal 45.

Figure 3:
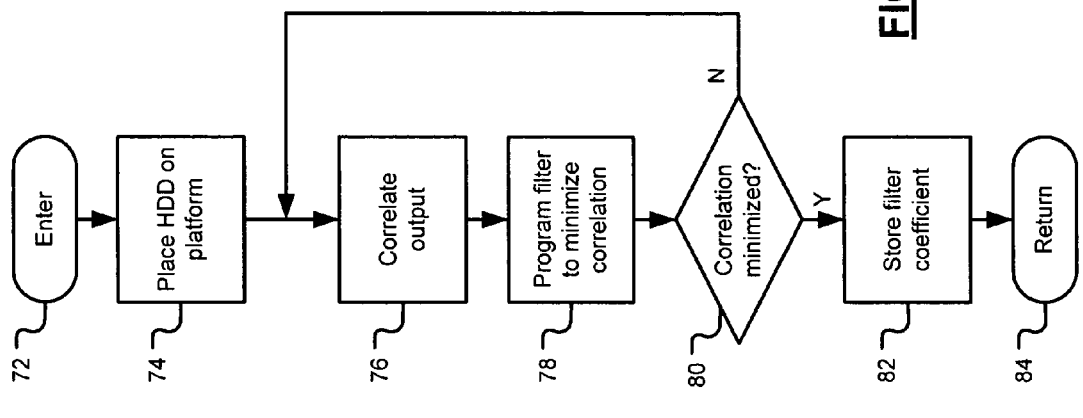
FIG. 3 is a flowchart of a method for calibrating the servo control system of FIG. 1.

Referring now to FIG. 3, a flowchart shows a method 70 that can be used with the calibration fixture 60 to program filter module 36. Control begins in a start block 72. Control immediately proceeds to block 74 where disk drive 10 is secured to vibration platform 62. Control then proceeds to block 76 where correlator module 38 indicates the correlation between the vibration signal and error signal 45. Control then proceeds to block 78 and adapts the coefficients of programmable filter module 36 to reduce the correlation in block 76. Control then proceeds to decision block 80 and determines whether the correlation between the vibration signal and error signal 45 has reached a minimum. If not then control returns to block 76. Otherwise control proceeds to block 82 and stores the filter coefficients in a non-volatile memory associated with programmable filter module 36. Control then returns to other unspecified tasks via return block 84.

Figure 4A:
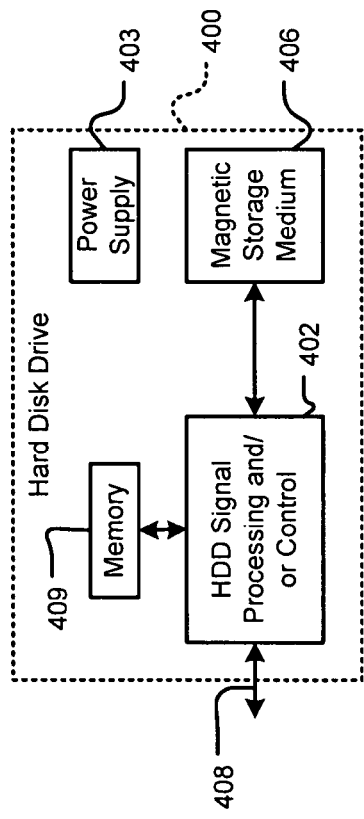
FIG. 4A is a functional block diagram of a hard disk drive.

Referring now to FIGS. 4A-4G, various exemplary implementations of the device are shown. Referring now to FIG. 4A, the devices can be implemented in a HDD 400. The devices may be implemented in either or both signal processing and/or control circuits which are generally identified in FIG. 4A at 402. In some implementations, the signal processing and/or control circuits 402 and/or other circuits (not shown) in the HDD 400 may also process data, perform coding and/or encryption, perform calculations, and/or format data that is output to and/or received from a magnetic storage medium 406.

The HDD 400 may communicate with a host device (not shown) such as a computer, mobile computing devices such as personal digital assistants, cellular phones, media or MP3 players and the like, and/or other devices via one or more wired or wireless communication links 408. The HDD 400 may be connected to memory 409 such as random access memory (RAM), low latency nonvolatile memory such as flash memory, read only memory (ROM) and/or other suitable electronic data storage. The HDD 400 may include a power supply 403.

Figure 4B:
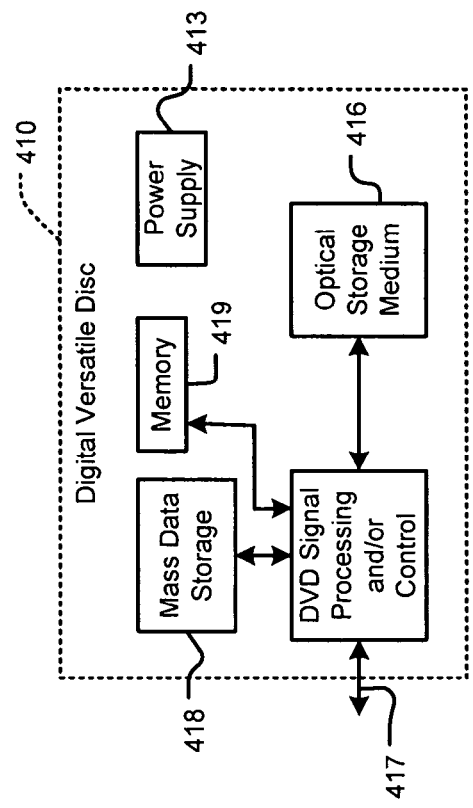
FIG. 4B is a functional block diagram of a digital versatile disk (DVD)

Referring now to FIG. 4B, the device can be implemented in a digital versatile disc (DVD) drive 410. The device may implement and/or be implemented in mass data storage 418 of the DVD drive 410. The signal processing and/or control circuit 412 and/or other circuits (not shown) in the DVD drive 410 may process data, perform coding and/or encryption, perform calculations, and/or format data that is read from and/or data written to an optical storage medium 416. In some implementations, the signal processing and/or control circuit 412 and/or other circuits (not shown) in the DVD drive 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD drive 410 may communicate with mass data storage 418 that stores data in a nonvolatile manner. The mass data storage 418 may include a HDD. The HDD may have the configuration shown in FIG. 4A. The HDD may be a mini HDD that includes one or more platters having a diameter that is smaller than approximately 1.8". The DVD drive 410 may be connected to memory 419 such as RAM, ROM, low latency nonvolatile memory such as flash memory and/or other suitable electronic data storage. The DVD drive 410 may include a power supply 413.

Figure 4C:
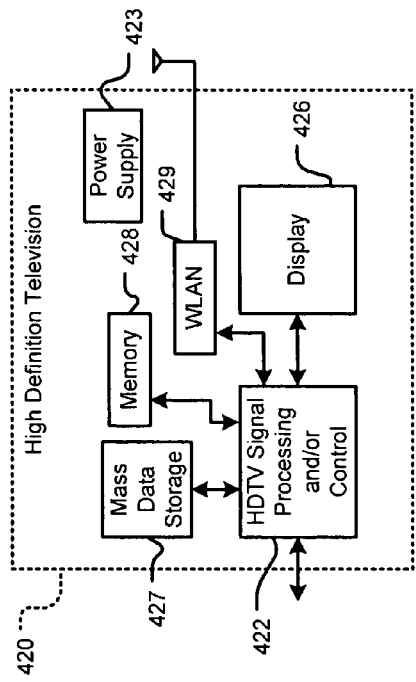
FIG. 4C is a functional block diagram of a high definition television.

Referring now to FIG. 4C, the device can be implemented in a high definition television (HDTV) 420. The device may implement and/or be implemented in mass data storage 427 of the HDTV 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. At least one HDD may have the configuration shown in FIG. 4A and/or at least one DVD may have the configuration shown in FIG. 4B. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429. The HDTV 420 may include a power supply 423.

Figure 4D:
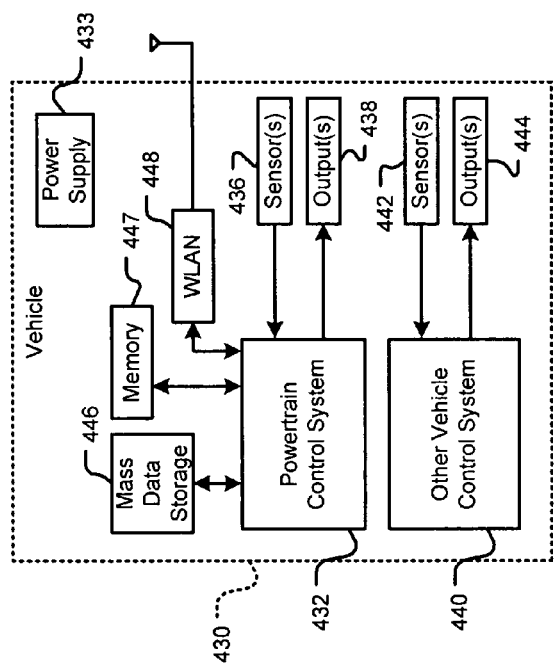
FIG. 4D is a functional block diagram of a vehicle control system.

Referring now to FIG. 4D, the device may implement and/or be implemented in a mass data storage 446 that communicates with one or more control systems of a vehicle 430. The vehicle 430 includes a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The vehicle 430 may also include other control systems 440. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The mass data storage 446 stores data in a nonvolatile manner. The mass data storage 446 may include optical and/or magnetic storage devices for example HDDs and/or DVDs. At least one HDD may have the configuration shown in FIG. 4A and/or at least one DVD may have the configuration shown in FIG. 4B. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown). Vehicle 433 may include a power supply 433.

Figure 4E:
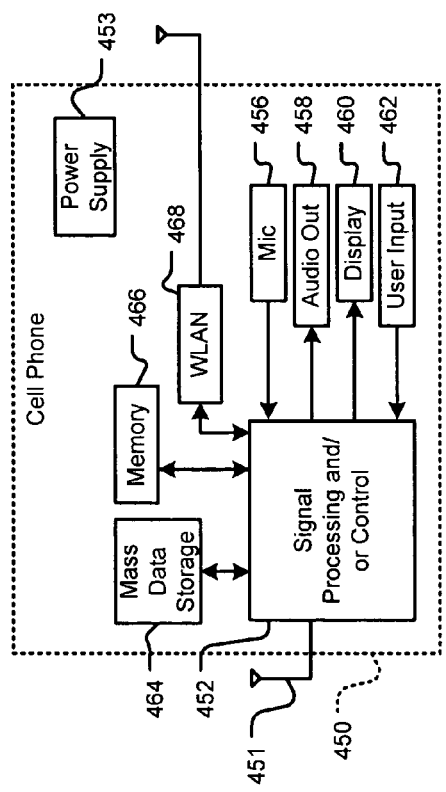
FIG. 4E is a functional block diagram of a cellular phone.

Referring now to FIG. 4E, the device can be implemented in a cellular phone 450 that may include a cellular antenna 451. The device may implement and/or be implemented in mass data storage 464 of the cellular phone 450. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVDs. At least one HDD may have the configuration shown in FIG. 4A and/or at least one DVD may have the configuration shown in FIG. 4B. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468. The cellular phone 450 may also include a power supply 453.

Figure 4F:
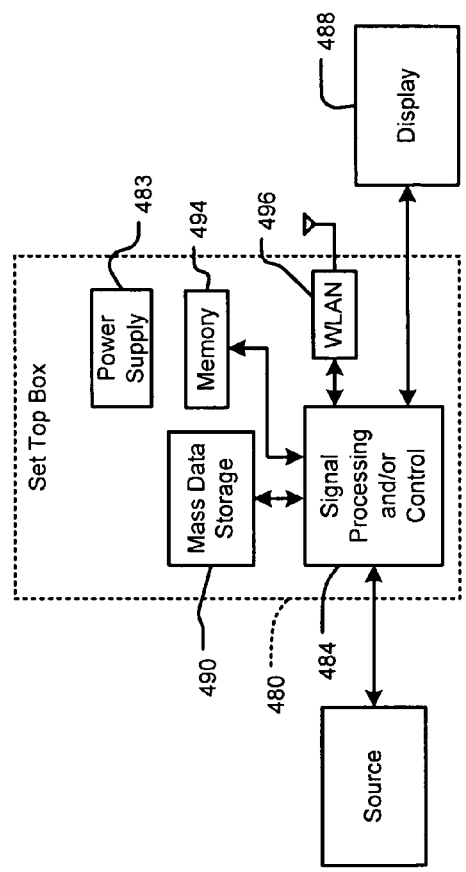
FIG. 4F is a functional block diagram of a set top box.

Referring now to FIG. 4F, the device can be implemented in a set top box 480. The device may implement and/or be implemented in mass data storage 490 of the set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example HDDs and/or DVDs. At least one HDD may have the configuration shown in FIG. 4A and/or at least one DVD may have the configuration shown in FIG. 4B. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496. The set top box 480 also includes a power supply 483.

Figure 4G:
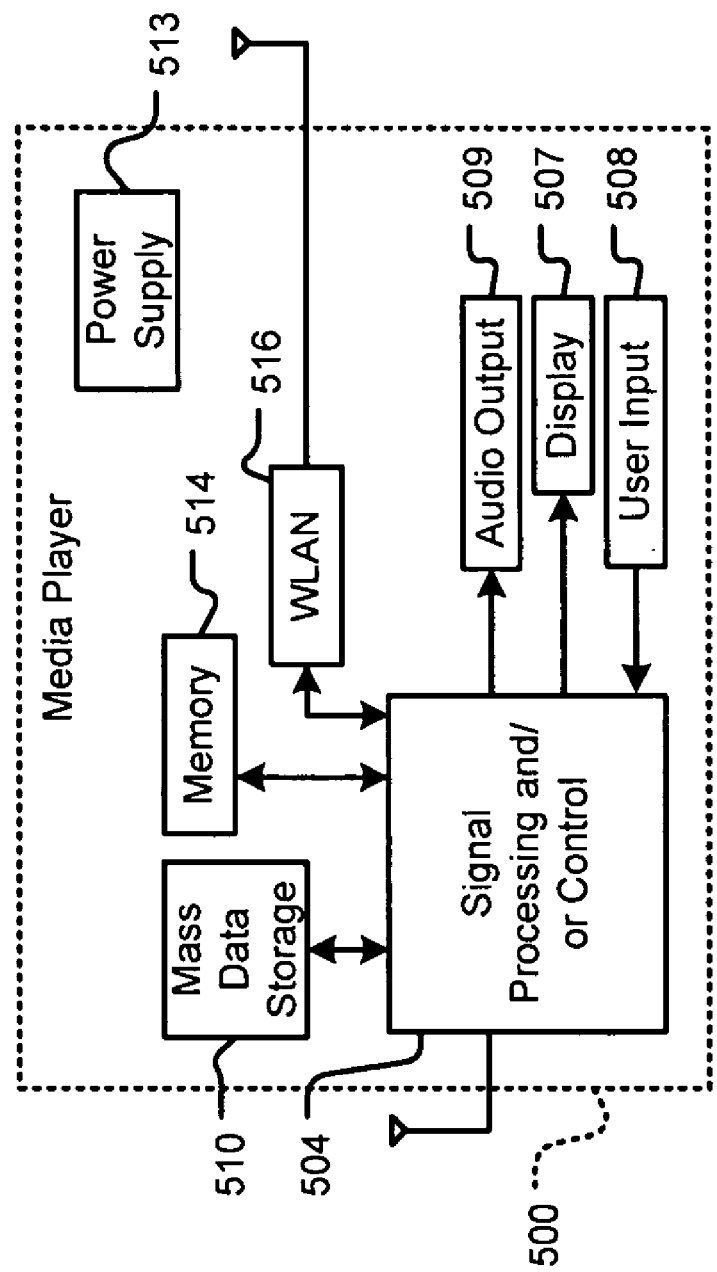
FIG. 4G is a functional block diagram of a media player.

Referring now to FIG. 4G, the device can be implemented in a media player 500. The device may implement and/or be implemented in mass data storage 510 of the media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example HDDs and/or DVDs. At least one HDD may have the configuration shown in FIG. 4A and/or at least one DVD may have the configuration shown in FIG. 4B. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. The media player 500 also includes a power supply 503.

Still other implementations in addition to those described above are contemplated. Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A control system comprising:
   a filter module that generates a filtered disturbance signal based on a disturbance signal and a transfer function of the filter module;
   a set point adjustment module that generates an adjusted set point signal based on a set point signal and the filtered disturbance signal;
   a servo control module that generates an error signal based on the adjusted set point signal and a position feedback signal; and
   a filter adjustment module that generates a filter adjustment signal based on the disturbance signal and the error signal, wherein the filter adjustment signal adjusts the transfer function.

2. The control system of claim 1, further comprising a disturbance sensor that generates the disturbance signal, wherein the disturbance sensor is selected from a group consisting of a vibration sensor, an inertial sensor and a shock sensor.

3. The control system of claim 1, wherein the transfer function of the filter module is based on a plurality of filter coefficients.

4. The control system of claim 3, wherein the plurality of filter coefficients of the filter module are determined based on an adaptive least mean squares (LMS) algorithm.

5. The control system of claim 1, wherein the set point signal is based on a desired position signal and the position feedback signal.

6. A storage system comprising the control system of claim 5, the storage system further comprising:
   a read/write head that generates the position feedback signal; and
   a rotating platter that includes servo codes that are read by the read/write head,
   wherein the position feedback signal is based on the servo codes.

7. The storage system of claim 6, wherein the desired position signal identifies one of a plurality of tracks of the rotating platter.

8. The storage system of claim 6, further comprising a read/write arm for positioning the read/write head based on a command signal generated by the servo control module.

9. The storage system of claim 6, wherein the rotating platter is selected from a group consisting of a magnetic rotating platter and an optical rotating platter.

10. The control system of claim 1, wherein the position feedback signal is updated at predetermined intervals and the filter adjustment module generates the filter adjustment signal between the predetermined intervals.

11. A method comprising:
   filtering a disturbance signal using a filter transfer function to generate a filtered disturbance signal;
   generating an adjusted set point signal based on a set point signal and the filtered disturbance signal;
   generating an error signal based on the adjusted set point signal and a position feedback signal;
   generating a filter adjustment signal based on the disturbance signal and the error signal; and
   adjusting the filter transfer function based on the filter adjustment signal.

12. The method of claim 11, further comprising generating the disturbance signal based on vibration of a rotating platter within a storage system.

13. The method of claim 11, wherein the filter transfer function is based on a plurality of filter coefficients.

14. The method of claim 13, further comprising determining the plurality of filter coefficients based on an adaptive least mean squares (LMS) algorithm.

15. The method of claim 11, further comprising generating the set point signal based on a desired position signal and the position feedback signal.

16. The method of claim 15, further comprising:
   reading servo codes of a rotating platter; and
   generating the position feedback signal based on the servo codes.

17. The method of claim 16, further comprising identifying one of a plurality of tracks of the rotating platter based on the desired position signal.

18. The method of claim 16, wherein the rotating platter is selected from a group consisting of a magnetic rotating platter and an optical rotating platter.

19. The method of claim 11, further comprising:
   updating the position feedback signal at predetermined intervals; and
   generating the adjustment signal between the predetermined intervals.

* * * * *

UNITED STATES PATENT AND TRADEMARK OFFICE
CERTIFICATE OF CORRECTION

PATENT NO. : 7,529,057 B1  
APPLICATION NO. : 12/231921  
DATED : May 5, 2009  
INVENTOR(S) : Pantas Sutardja Page 1 of 1

It is certified that error appears in the above-identified patent and that said Letters Patent is hereby corrected as shown below:

Column 5, Line 13          Insert -- a -- after "is"

Signed and Sealed this

Sixteenth Day of June, 2009

JOHN DOLL  
*Acting Director of the United States Patent and Trademark Office*